Patented May 24, 1949

2,470,948

UNITED STATES PATENT OFFICE 2,470,948

DI(ORTHOACYLAMINOARYL)DISULFIDE SOFTENERS FOR RUBBERS

Philip T. Paul, Naugatuck, Conn., assignor to United States Rubber Company, New York, N. Y., a corporation of New Jersey No Drawing. Original application January 26, 1945, Serial No. 574,817. Divided and this application February 6, 1947, Serial No. 726,956

17 Claims. (Cl. 260—30.8)

This invention relates to softeners for rubbers, and more particularly to the softening or plasticizing of natural rubbers, and synthetic rubbers, such as polymerized chloro-2-butadiene-1,3 commercially known as neoprene or GRM rubber, copolymers of butadiene-1,3 and styrene, commercially known as Buna S or GRS rubber, and copolymers of butadiene-1,3 and acrylonitrile, commercially known as Buna N or GRN rubber.

This application is a division of application Serial No. 574,817, filed January 26, 1945, which is a continuation-in-part of application Serial No. 522,625, filed February 16, 1944, now abandoned.

I have discovered that di(orthoacylaminoaryl) disulfides are excellent softeners for natural rubber, and for synthetic rubbers such as polymers of butadienes-1,3 and copolymers of butadienes-1,3 with other polymerizable compounds which are capable of forming copolymers with butadienes-1,3. The di(orthoacylaminoaryl) disulfides which are the new softeners for various rubbers according to the present invention may be designated by the general formula

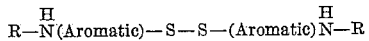

where R is an acyl radical, that is, a radical derived from an organic acid by removal of the hydroxyl group, and the nitrogens are in ortho positions to the sulfur atoms. Examples of the acyl radical "R" are formyl, acetyl, propionyl, butyryl, valeryl, caproyl, capryl, pelargonyl, myristyl, palmitoyl, stearoyl, margaryl, crotonyl, benzoyl, naphthoyl, p-phenyl benzoyl, monochloracetyl, dichloracetyl, benzene sulfonyl, p-tolyl sulfonyl, thioacetyl, thiopropionyl. The aromatic nucleus of the general formula may be an arylene nucleus of the benzene, naphthalene, or biphenyl series which may be unsubstituted save for the sulfur and amino group or which may be otherwise substituted as by such groups as alkyl, aryl, hydroxyl, halogen, aryloxy, alkoxy, tertiary amino. The preferred di(orthoacylaminoaryl) disulfides are the di(2-acylaminophenyl) disulfides, those in which the acyl radicals are derived from aromatic acids being di(2-aroylaminophenyl) disulfides and those in which the acyl groups are derived from alkanoic acids being di(2-alkanoylaminophenyl) disulfides. The softener 2,2'-dithio bis acetanilide, otherwise known as 2,2'-diacetamino diphenyl disulfide, having the formula

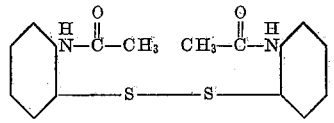

is the present preferred embodiment. Other examples of di(orthoacylaminoaryl) disulfides are 2,2'-dithio bis (4-methyl acetanilide), 2,2'-dithio bis (4-methoxy acetanilide), 2,2'-dithio bis (4-phenoxy acetanilide), 2,2'-dithio bis (4-chloro acetanilide), 2,2'-dithio bis (4-dimethylamino acetanilide), 2,2'-dithio bis (1-acetyl amino naphthalene), 1,1'-dithio bis (2-acetyl amino naphthalene).

Di(orthoacylaminoaryl) disulfides are known per se and may be prepared in known manner by acylating the di(orthoaminoaryl) disulfides. For example, 2,2'-bis thioaniline may be prepared from aniline and sulfur according to the procedure of Hofman in Berichte der Deutschen Chemischen Gesellschaft, vol. 27, p. 2807 (1894). The 2,2' bis thioaniline may be acylated with glacial acetic acid and acetic anhydride according to the method of Clark, Journal of the Chemical Society (London), of 1928, page 2313, to give 2,2'-dithio bis acetanilide or 2,2'-diacetamido diphenyl disulfide. Clark similarly discloses the preparation of 2,2'-dithio bis propionanilide from 2,2'-bis thioaniline and propionic acid, and also 2,2'-dithio bis benzanilide form 2,2'-bis thioaniline and benzoyl chloride. 2,2'-dithio bis formanilide may be prepared from 2,2'-bis thioaniline and formic acid by the method of Tomlinson, Journal of the Chemical Society (London) of 1936, p. 1607. The amount of di(orthoacylaminoaryl) disulfide is not critical, generally amounts from about .5 part to 5 parts or more per 100 parts of the rubber being used, depending on the particular chemical, the kind of rubber, and the degree of softening desired. The di(orthoacylaminoaryl) disulfide, as is customary with plasticizers, is preferably mixed into the rubber before the usual vulcanizing ingredients, and after the rubber has become softened compounding ingredients such as sulfur, zinc oxide, accelerators, antioxidants, fillers and the like may be added.

Natural rubbers, such as *Hevea brasiliensis* and guayule, may be softened by mixing with a small amount of di(orthoacylaminoaryl) disulfide in a mixer, or on a mill at conventional milling temperature. Synthetic rubbers which are polymers of butadienes-1,3 and copolymers of butadienes-1,3 with other polymerizable compounds which are capable of forming copolymers with butadienes-1,3 are also readily plasticized by similarly incorporating therein a di(orthoacylaminoaryl) disulfide. Such synthetic rubbers are known. Examples of synthetic rubbers which are polymers of butadienes-1,3 are polymerized butadiene-1,3, methyl-2-butadiene-1,3 (isoprene), chloro-2-butadiene-1,3 (chloroprene), piperylene, 2,3-dimethylbutadiene-1,3. Illustrative of other polymerizable compounds which are capable of forming copolymers with such butadienes-1,3, as referred to above, are compounds which contain a $CH_2=C<$ group where at least one of the disconnected valences is attached to an electroactive group, that is, a group which substantially increases the electrical dissymmetry or polar character of the molecule. Examples of compounds which contain a $CH_2=C<$ group and are copolymerizable with butadienes-1,3 are aryl olefins, such as styrene and vinyl naphthalene; the alpha methylene carboxylic acids, and their esters, nitriles, and amides such as acrylic acid, methyl acrylate, methyl methacrylate, acrylonitrile, methacrylonitrile, methacrylamide; isobutylene; methyl vinyl ether; methyl vinyl ketone; vinylidene chloride. The expression "a rubber" as used herein refers to such natural and artificial rubbers. Present day commercial synthetic rubbers of the above types are polymerized chloro-2-butadiene-1,3, known as neoprene or GRM rubber, copolymers of butadiene-1,3 and styrene, known as Buna S or GRS rubber, and copolymers of butadiene-1,3 and acrylonitrile, known as Buna N or GRN rubber.

The following examples are illustrative of the softening or plasticizing effect of di(orthoacylaminoaryl) disulfides on various rubbers, particularly on the commercial general purpose Buna S of GRS rubber, and other commercial rubbers. In the method of testing the effectiveness of a di(orthoacylaminoaryl) disulfide on a rubber, equal parts of the rubber itself were placed on the two halves of a divided mill having its rolls heated to approximately 250° F. At this temperature, the rubber quickly smooths out forming two separate continuous sheets around the roll. As soon as these continuous sheets have been formed, the chemical to be tested is added to one of these sheets. The milling of both sheets is continued for approximately ten minutes after which the two sheets are removed from the mill and allowed to stand twelve to fourteen hours at room temperature. In some cases, a different milling time was used. In the examples below, it is to be understood that a ten minute milling period was used unless otherwise specified. After such rest, the two samples, namely, the control sheet to which no di(orthoacylaminoaryl) disulfides had been added, and the sheet to which the chemical had been added, are tested in a Mooney shearing disc plastometer. This instrument has been described by M. Mooney in Industrial and Engineering Chemistry, (Anal. Ed.) 6, 147 (1934). By means of this device, the viscosity of a plastic material in shear may be readily and quantitatively measured. The readings recorded in the data in the following examples are viscosity readings after four minutes between platens of the instrument at 212° F., a one minute warm up period being used. The readings are based on an arbitrary standard, the lower the readings, the lower the viscosity and hence the greater the plasticity.

*Example I*

The following table of Mooney viscosities on various samples of GRS rubber (commercial copolymer of butadiene-1,3 and styrene) containing various di(orthoacylaminoaryl) disulfides and the corresponding control samples in each case illustrate the effectiveness of these chemicals as softeners for GRS rubber. Incidentally, the differences in the viscosities of the various controls show the great variations in this type of synthetic rubber.

| Di(orthoacylaminoaryl) disulfide | Parts Chemical per 100 parts GRS Rubber | Mooney Viscosity | |
|---|---|---|---|
| | | Control | With Chemical |
| 2,2'-Dithio bis acetanilide | 2 | 47 | 25 |
| Do | 5 | 76 | 32 |
| 2,2'-Dithio bis formanilide | 2 | 50 | 47 |
| 2,2'-Dithio bis propionanilide | 2 | 39 | 22 |
| 2,2'-Dithio bis butyranilide (6 minute milling period) | 2 | 38 | 14 |
| 2,2'-Dithio bis benzene sulfonanilide | 2 | 58 | 35 |
| 2,2'-Dithio bis (4-phenylacetanilide) | 2 | 57 | 54 |
| 2,2'-Dithio bis benzanilide | 2 | 39 | 19 |

Tests on GRS rubber with the unsubstituted diphenyl disulfide, and with a cetanilide itself do not show the softening effect of the di(orthoacylaminoaryl) disulfides as illustrated in the above table. For example, Mooney viscosities of GRS rubber as a control and with 2 parts diphenyl disulfide per 100 parts of the GRS rubber ran 58 and 76 respectively; another control and sample with 2 parts acetanilide (22 minute milling period) gave Mooney viscosities of 29 and 34 respectively, showing a lack of softening effect of these chemicals as compared with the di(orthoacylaminoaryl) disulfides as shown in the above table.

*Example II*

In the following table are shown Mooney viscosities on various control samples of commercial natural rubber. *Hevea brasiliensis* "smoked sheet," and samples containing 2 parts of various di(orthoacylaminoaryl) disulfides per 100 parts of rubber.

| Di(orthoacylaminoaryl) disulfide | Mooney Viscosity | |
|---|---|---|
| | Control | With Chemical |
| 2,2'-Dithio bis acetanilide | 76 | 29 |
| 2,2'-Dithio bis propionanilide | 75 | 14 |
| 2,2'-Dithio bis benzanilide | 66 | 10 |

Mooney viscosities on a smoked sheet control and the smoked sheet with 2 parts diphenyl disulfide per 100 parts rubber ran 80 and 75 respectively; another control and sample with 2 parts acetanilide gave Mooney viscosities of 80 and 81 respectively, showing a lack of softening effect as compared with the chemicals in the table above. Another control and sample with 2 parts of 2,2'-diamino diphenyl disulfide (2,2'-bis thioaniline) gave Mooney viscosities of 76 and 56 respectively, showing the superiority as plasticizers for rubber of the di(orthoacylaminoaryl) disulfides shown in the above table over the 2,2'-bis thioaniline without acylation. Another disadvantage of 2,2'-bis thioaniline is its extreme toxicity.

Example III

Tests similar to those of Examples I and II on polymerized chloro-2-butadiene-1,3 commercially known as neoprene or GRM rubber, with 2 parts of various di(orthoacylaminoaryl) disulfides as softeners per 100 parts of the GRM rubber gave results as shown in the following table:

| Di(orthoacylaminoaryl) disulfide | Mooney Viscosity | |
| --- | --- | --- |
| | Control | With Chemical |
| 2,2'-Dithio bis acetanilide (7.5 minute milling period) | 30 | 23 |
| 2,2'-Dithio bis propionanilide | 76 | 40 |
| 2,2'-Dithio bis benzanilide | 78 | 43 |

Example IV

Tests similar to those of Examples I and II on GRN rubber (copolymer of butadiene-1,3 and acrylonitrile) with 2 parts of various di(orthoacylaminoaryl) disulfides as softeners per 100 parts of GRN rubber gave results as shown in the following table:

| Di(orthoacylaminoaryl) disulfide | Mooney Viscosity | |
| --- | --- | --- |
| | Control | With Chemical |
| 2,2'-Dithio bis acetanilide (20 minute milling period) | 97 | 86 |
| 2,2'-Dithio bis propionanilide | 106 | 88 |
| 2,2'-Dithio bis benzanilide | 110 | 94 |

Rubbers which may be mixed with the di(orthoacylaminoaryl) disulfides according to the present invention may be mixed with various other compounding ingredients, for example, other softeners, pigments, fillers, vulcanizing agents, accelerators, antioxidants and the like, and may be vulcanized in the conventional manner.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition of matter comprising a rubber selected from the group consisting of natural rubber, polymers of butadienes-1,3, and copolymers of butadienes-1,3 with a compound which contains a $CH_2=C<$ group and is copolymerizable with butadienes-1,3, and, as a softener therefore, 2,2'-dithio bis benzanilide, the said 2,2'-dithio bis benzanilide being present in a quantity not more than 5 parts per 100 parts of said rubber.

2. A composition of matter comprising a rubber selected from the group consisting of natural rubber, polymers of butadienes-1,3, and copolymers of butadienes-1,3 with a compound which contains a $CH_2=C<$ group and is copolymerizable with butadienes-1,3, with which is admixed .5 to 5 parts of 2,2'-dithio bis benzanilide per 100 parts of said rubber.

3. A composition of matter comprising a synthetic rubber copolymer of butadiene-1,3 and styrene and, as a softener therefor, .5 to 5 parts of 2,2'-dithio bis benzanilide per 100 parts of said copolymer.

4. A composition of matter comprising a synthetic rubber copolymer of butadiene-1,3 and styrene and, as a softener therefor, 2,2'-dithio bis benzanilide, the said 2,2'-dithio bis benzanilide being present in a quantity not more than 5 parts per 100 parts of said copolymer.

5. A composition of matter comprising natural rubber with which is admixed .5 to 5 parts of 2,2'-dithio bis benzanilide per 100 parts of said rubber.

6. A composition of matter comprising natural rubber and, as a softener therefor, 2,2'-dithio bis benzanilide, the said 2,2'-dithio bis benzanilide being present in a quantity not more than 5 parts per 100 parts of said rubber.

7. A composition of matter comprising polymerized chloro-2-butadiene-1,3 with which is admixed .5 to 5 parts of 2,2'-dithio bis benzanilide per 100 parts of said polymer.

8. A composition of matter comprising polymerized chloro-2-butadiene-1,3, and as a softener therefor, 2,2'-dithio bis benzanilide, the said 2,2'-dithio bis benzanilide being present in a quantity not more than 5 parts per 100 parts of said polymer.

9. The method of plasticizing a rubber selected from the group consisting of natural rubber, polymers of butadiene-1,3, and copolymers of butadienes-1,3 with a compound which contains a $CH_2=C<$ group and is copolymerizable with butadienes-1,3, which comprises incorporating therein .5 to 5 parts of 2,2'-dithio bis benzanilide per 100 parts of said rubber.

10. The method of plasticizing a rubber selected from the group consisting of natural rubber, polymers of butadienes-1,3, and copolymers of butadienes-1,3 with a compound which contains a $CH_2=C<$ group and is copolymerizable with butadienes-1,3, which comprises incorporating therein 2,2'-dithio bis benzanilide, the said 2,2'-dithio bis benzanilide being in a quantity not more than 5 parts per 100 parts of said rubber.

11. The method of plasticizing a synthetic rubber copolymer of butadiene-1,3 and styrene which comprises incorporating therein 2,2'-dithio bis benzanilide, the said 2,2'-dithio bis benzanilide being in a quantity not more than 5 parts per 100 parts of said copolymer.

12. The method of plasticizing a synthetic rubber copolymer of butadiene-1,3 and styrene which comprises incorporating therein .5 to 5 parts of 2,2'-dithio bis benzanilide per 100 parts of said copolymer.

13. The method of plasticizing natural rubber which comprises incorporating therein 2,2'-dithio bis benzanilide, the said 2,2'-dithio bis benzanilide being in a quantity not more than 5 parts per 100 parts of said rubber.

14. The method of plasticizing natural rubber which comprises incorporating therein .5 to 5 parts of 2,2'-dithio bis benzanilide per 100 parts of said rubber.

15. The method of plasticizing polymerized chloro-2-butadiene-1,3 which comprises incorporating therein 2,2'-dithio bis benzanilide, the said 2,2'-dithio bis benzanilide being in a quantity not more than 5 parts per 100 parts of said polymer.

16. The method of plasticizing polymerized chloro-2-butadiene-1,3 which comprises incorporating therein .5 to 5 parts of 2-2'-dithio bis benzanilide per 100 parts of said polymer.

17. A composition of matter comprising a rubber selected from the group consisting of natural rubber, polymers of butadienes-1,3, and copolymers of butadienes-1,3 with a compound which contains a $CH_2=C<$ group and is copolymerizable with butadienes-1,3, and, as a softener therefor, a di(2-aroylaminophenyl) disulfide, the said di(2-aroylaminophenyl) disulfide being present in a quantity not more than 5 parts per 100 parts of said rubber.

PHILIP T. PAUL.

REFERENCES CITED

The following references are of record in the file of this patent:

UNITED STATES PATENTS

| Number | Name | Date |
|---|---|---|
| 2,378,519 | Vincent | June 19, 1945 |
| 2,413,857 | Bersworth | Jan. 7, 1947 |
| 2,415,356 | Kellog | Feb. 4, 1947 |
| 2,416,667 | Schroeder | Mar. 4, 1947 |
| 2,438,753 | Kellog | Mar. 20, 1948 |
| 2,449,418 | Sharkey | Sept. 14, 1948 |